US011404212B2

(12) United States Patent
Maeno et al.

(10) Patent No.: US 11,404,212 B2
(45) Date of Patent: Aug. 2, 2022

(54) CAPACITOR

(71) Applicant: Panasonic Intellectual Property Management Co., Ltd., Osaka (JP)

(72) Inventors: Fumikazu Maeno, Toyama (JP); Toshihisa Miura, Aichi (JP); Eriko Kanatani, Toyama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/089,166

(22) Filed: Nov. 4, 2020

(65) Prior Publication Data

US 2021/0050153 A1 Feb. 18, 2021

Related U.S. Application Data

(63) Continuation of application No. PCT/JP2019/015584, filed on Apr. 10, 2019.

(30) Foreign Application Priority Data

May 24, 2018 (JP) .............................. JP2018-099348

(51) Int. Cl.
  *H01G 4/236* (2006.01)
  *H01G 4/224* (2006.01)
  *H01G 2/04* (2006.01)
(52) U.S. Cl.
  CPC .............. *H01G 4/236* (2013.01); *H01G 2/04* (2013.01); *H01G 4/224* (2013.01)
(58) Field of Classification Search
  CPC .................................. H01G 4/38; H01G 2/04
  See application file for complete search history.

(56) References Cited

U.S. PATENT DOCUMENTS

2011/0149467 A1* 6/2011 Azuma ................ B60W 20/00
 361/306.2
2014/0078803 A1 3/2014 Nishihara et al.
 (Continued)

FOREIGN PATENT DOCUMENTS

CN 103597732 A 2/2014
JP 2006216756 A * 8/2006
 (Continued)

OTHER PUBLICATIONS

International Search Report of PCT application No. PCT/JP2019/015584 dated Jun. 25, 2019.

(Continued)

*Primary Examiner* — Eric W Thomas
(74) *Attorney, Agent, or Firm* — McDermott Will & Emery LLP

(57) ABSTRACT

A capacitor includes a capacitor element, an electrode disposed on an end face of the capacitor element, a bus bar connected to the electrode, and a case housing the capacitor element. The bus bar is extended from an opening of the case to outside the case. Outside the case, the bus bar includes an extension part and a connection terminal. The extension part extends in a first direction along a side face of the case. The connection terminal is connected to the extension part. Further, the case includes a supporting part disposed on the side face of the case. The supporting part supports the bus bar to form a space between the side face and the extension part.

11 Claims, 7 Drawing Sheets

(56) References Cited

U.S. PATENT DOCUMENTS

2014/0119087 A1   5/2014   Matsuoka et al.
2018/0233285 A1   8/2018   Sato et al.
2019/0122821 A1   4/2019   Sato

FOREIGN PATENT DOCUMENTS

| JP | 2007-227696 | 9/2007 | |
|---|---|---|---|
| JP | 2012-217322 | 11/2012 | |
| JP | 2012-253883 | 12/2012 | |
| JP | 2014-027768 | 2/2014 | |
| JP | 2014-090629 | 5/2014 | |
| WO | 2017/081853 | 5/2017 | |
| WO | 2018/016348 | 1/2018 | |
| WO | WO-2018016349 A1 * | 1/2018 | ............ H01G 4/228 |

OTHER PUBLICATIONS

English Translation of Chinese Office Action dated Nov. 3, 2021 for the related Chinese Patent Application No. 201980032671.7.

\* cited by examiner

CAPACITOR

RELATED APPLICATIONS

This application is a continuation of the PCT International Application No. PCT/JP2019/015584 filed on Apr. 10, 2019, which claims the benefit of foreign priority of Japanese patent application No. 2018-099348 filed on May 24, 2018, the contents all of which are incorporated herein by reference.

BACKGROUND

1. Technical Field

The present disclosure relates to a capacitor.

2. Description of the Related Art

Conventionally, a capacitor including a capacitor element and a bus bar in which the capacitor element is connected to one end of the bus bar is known. The capacitor element is housed in a case. And an external connection terminal, which is provided in the other end of the bus bar, is extended from an opening of the case to outside the case (see, for example, Unexamined Japanese Patent Publication No. 2007-227696). The external connection terminal is connected to an external terminal extended from external equipment.

SUMMARY

A capacitor according to an aspect of the present disclosure includes a capacitor element, an electrode disposed on an end face of the capacitor element, a bus bar connected to the electrode, and a case housing the capacitor element. Here, the bus bar is extended from an opening of the case to outside the case. Outside the case, the bus bar includes an extension part and a connection terminal. The extension part extends in a first direction along a side face of the case. The connection terminal is connected to the extension part. Further, the case includes a supporting part disposed on the side face of the case. The supporting part supports the bus bar to form a space between the side face and the extension part.

The present disclosure provides a capacitor configured to suppress an occurrence of heat damage to a capacitor element.

Effects or meanings of the present disclosure are further clarified in the description of an exemplary embodiment below. However, it is to be understood that the exemplary embodiment described below is to be considered in all aspects as merely an example of implementing the present disclosure, and thus, the present disclosure is not limited to the exemplary embodiment below.

DETAILED DESCRIPTION OF EMBODIMENT

Figure 1A:
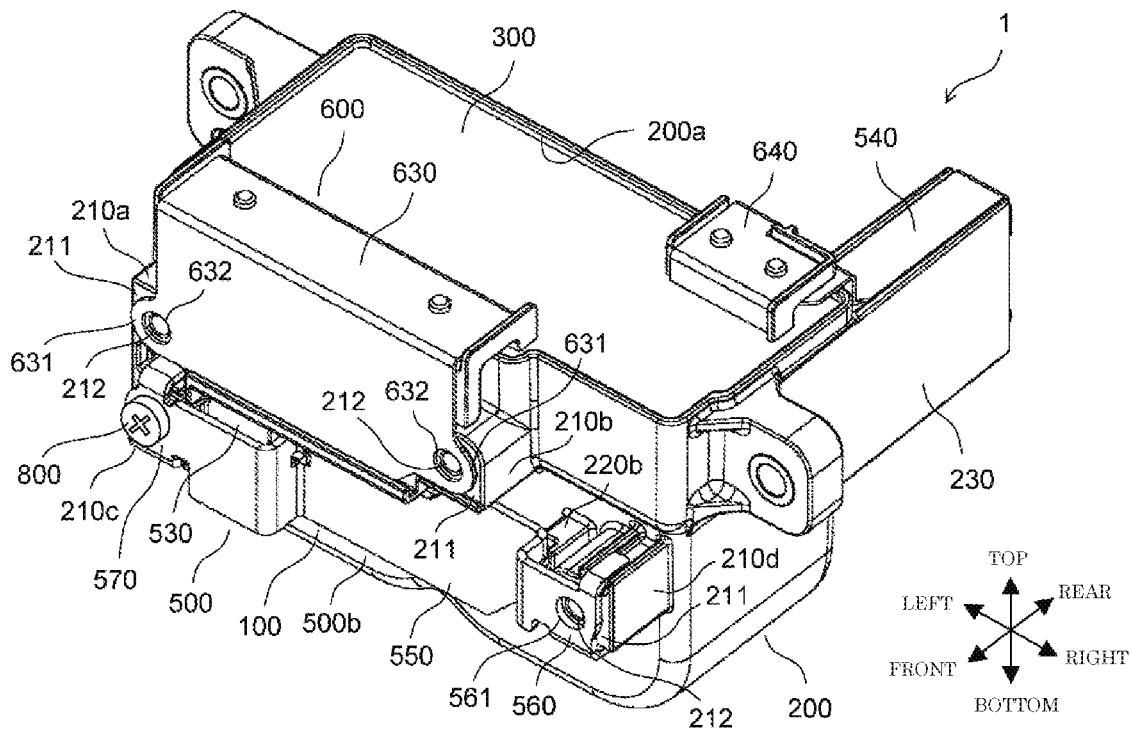
FIG. 1A is a front perspective view illustrating a film capacitor according to an exemplary embodiment.

A conventional capacitor has a configuration where an external connection terminal is located near an opening of a case and thus most part of a bus bar is arranged inside the case. With this configuration, when heat generated in an external terminal is transferred to the bus bar, or when heat is generated in the bus bar, the heat is not easily dissipated from the bus bar. Thus, the heat is further transferred to a capacitor element, thereby resulting in an occurrence of a heat damage of the capacitor element.

In recent years, with an increase in use of an electric automobile, the capacitor has been increasingly used for the electric automobile. For example, in some cases, the capacitor is connected to a power supply device for driving an electric motor or others. In this case, in particular, a current flowing from the power supply device to the capacitor tends to be large, and the large current generates heat in the external terminal and the bus bar, causing the heat damage of the capacitor element.

In view of problems described above, the present disclosure provides a capacitor configured to suppress an occurrence of heat damage to a capacitor element.

Film capacitor 1 according to an exemplary embodiment of the present disclosure will be described with reference to the drawings. For the sake of convenience, a front-to-rear direction, a left-to-right direction, and a top-to-bottom direction are additionally described in the drawings as appropriate. Note that, each of these directions is not an absolute direction but a relative direction with regard to an orientation of film capacitor 1.

In this exemplary embodiment, film capacitor 1 corresponds to a "capacitor" disclosed in the appended claims, and front side face 202 corresponds to a "side face" disclosed in the appended claims. Further, each of front terminal block 210c, front terminal block 210d, fixing block 220a, and fixing block 220b corresponds to a "supporting part" disclosed in the appended claims. Further, first end-face electrode 410 corresponds to an "electrode" disclosed in the appended claims, and first bus bar 500 corresponds to a "bus bar" disclosed in the appended claims. Further, inner bus bar 500a corresponds to a "first member" disclosed in the appended claims, and outer bus bar 500b corresponds to a "second member" disclosed in the appended claims. Further, outer relay terminal 550 corresponds to an "extension part" disclosed in the appended claims, and first front connection terminal 560 corresponds to a "connection terminal" disclosed in the appended claims.

Meanwhile, the description above is only intended to define correspondences between components in the appended claims and components in the exemplary embodiment. Each of the correspondences described above does not limit the scope of the claims to the configuration described in the exemplary embodiment.

Figure 1B:
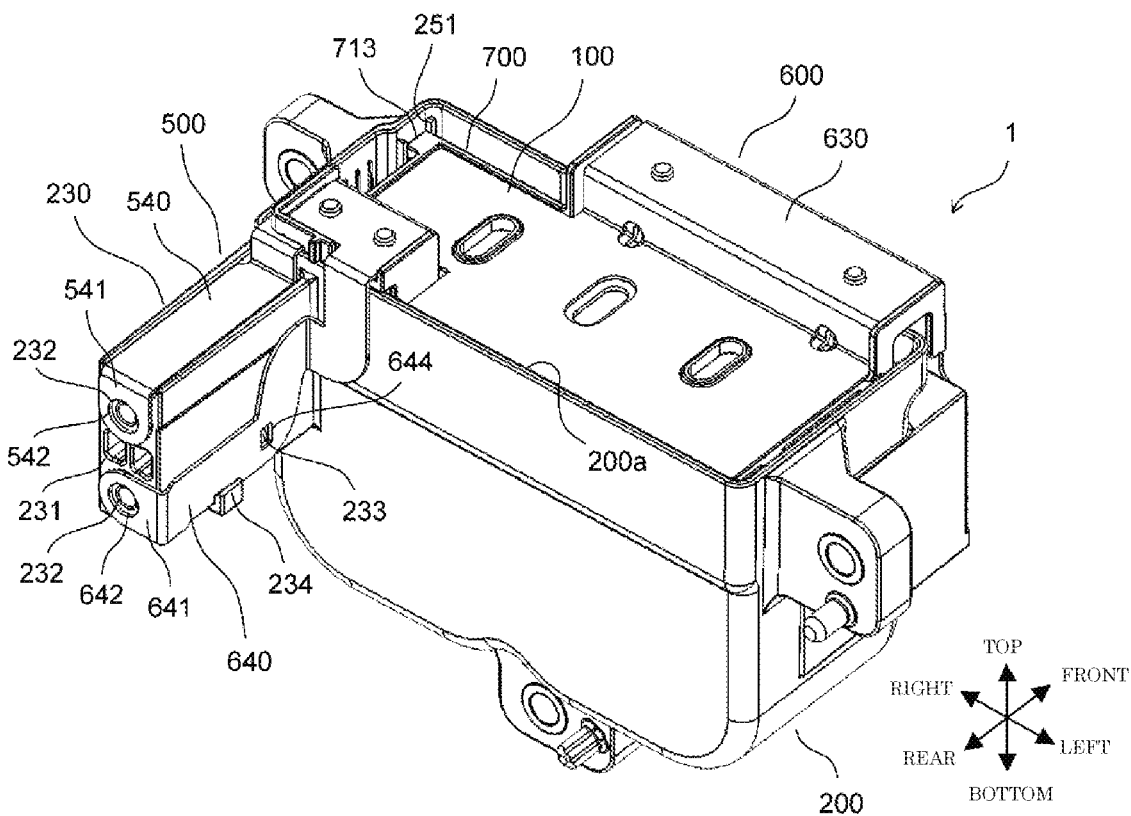
FIG. 1B is a rear perspective view illustrating the film capacitor according to the exemplary embodiment.

FIG. 1A is a front perspective view illustrating film capacitor 1 according to this exemplary embodiment, and FIG. 1B is a rear perspective view illustrating film capacitor 1 according to this exemplary embodiment. Note that, filling resin 300 is omitted in FIG. 1B.

As illustrated in FIGS. 1A and 1B, film capacitor 1 includes capacitor element unit 100, case 200, and filling resin 300. Capacitor element unit 100 is housed in case 200, and case 200 is filled with filling resin 300. Filling resin 300 is a thermosetting resin, for example, an epoxy resin. Most part of capacitor element unit 100 embedded in filling resin 300 is protected, by case 200 and filling resin 300, from moisture or shock.

Figure 2A:
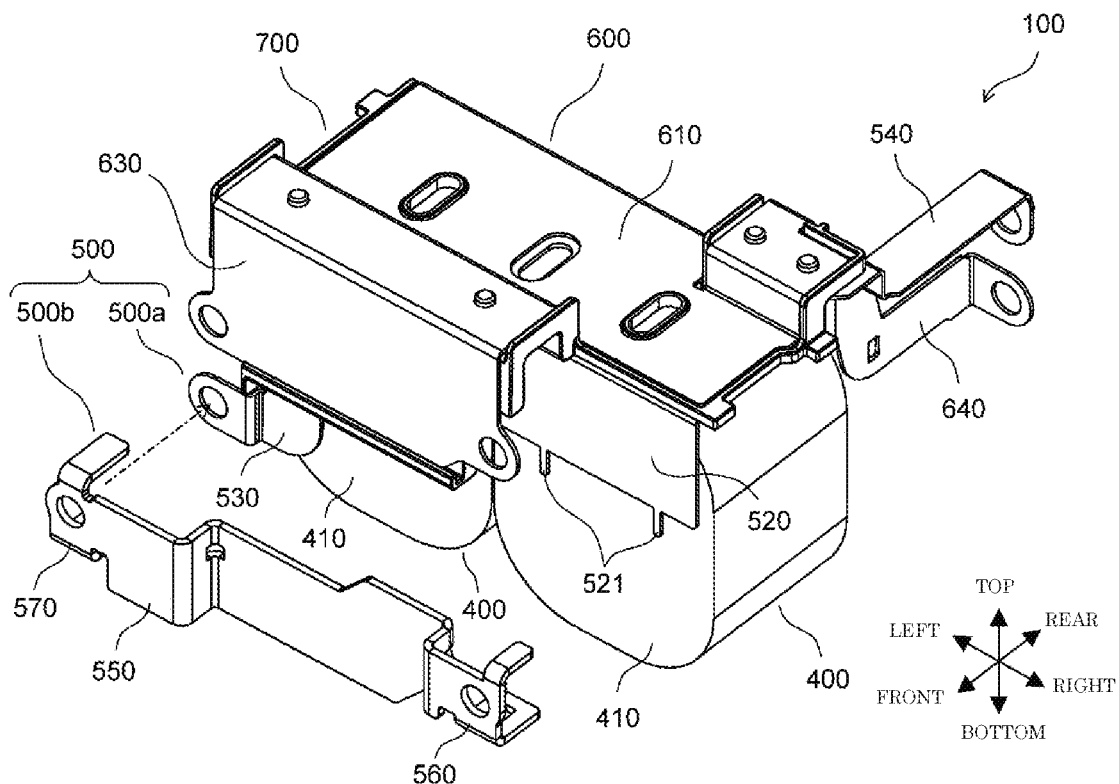
FIG. 2A is a front perspective view illustrating a capacitor element unit according to the exemplary embodiment in a state where an inner bus bar and an outer bus bar, each included in a first bus bar according to the exemplary embodiment, are separated from each other.
Figure 2B:
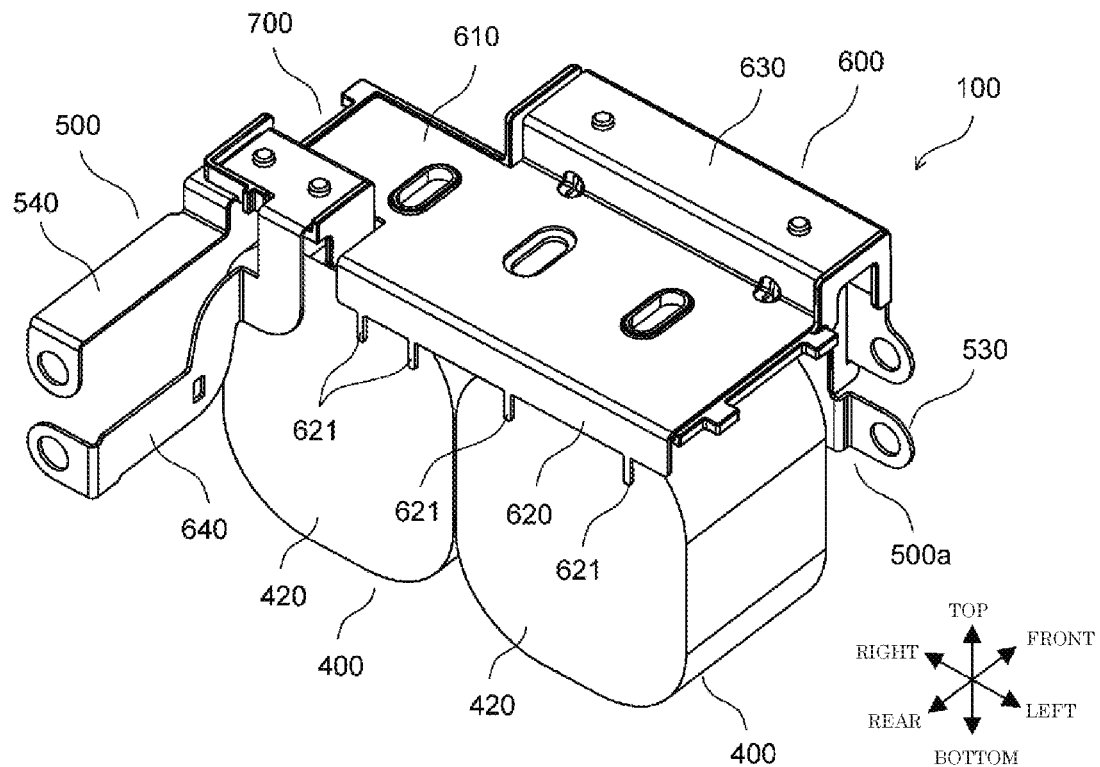
FIG. 2B is a rear perspective view illustrating the capacitor element unit according to this exemplary embodiment.
Figure 3:
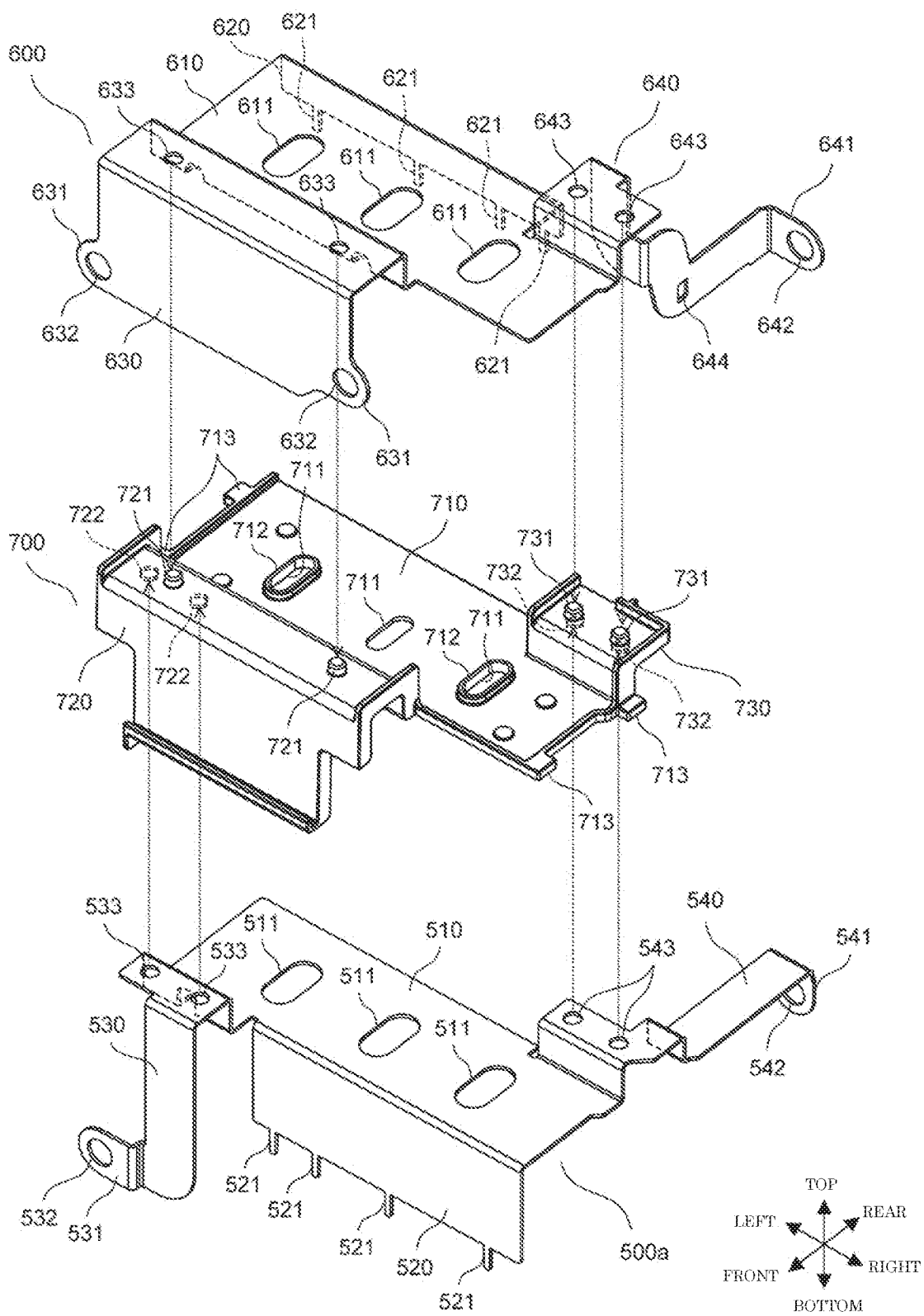
FIG. 3 is an exploded perspective view illustrating the inner bus bar, a second bus bar, and an insulating plate, each according to the exemplary embodiment.
Figure 4A:
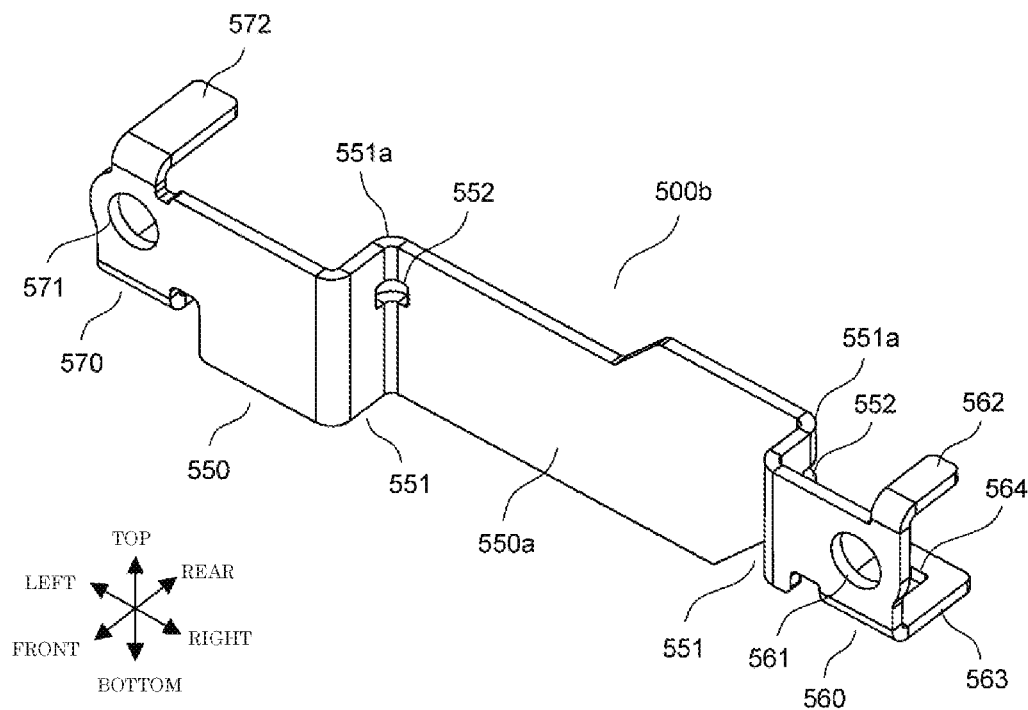
FIG. 4A is a front perspective view illustrating the outer bus bar according to the exemplary embodiment.
Figure 4B:
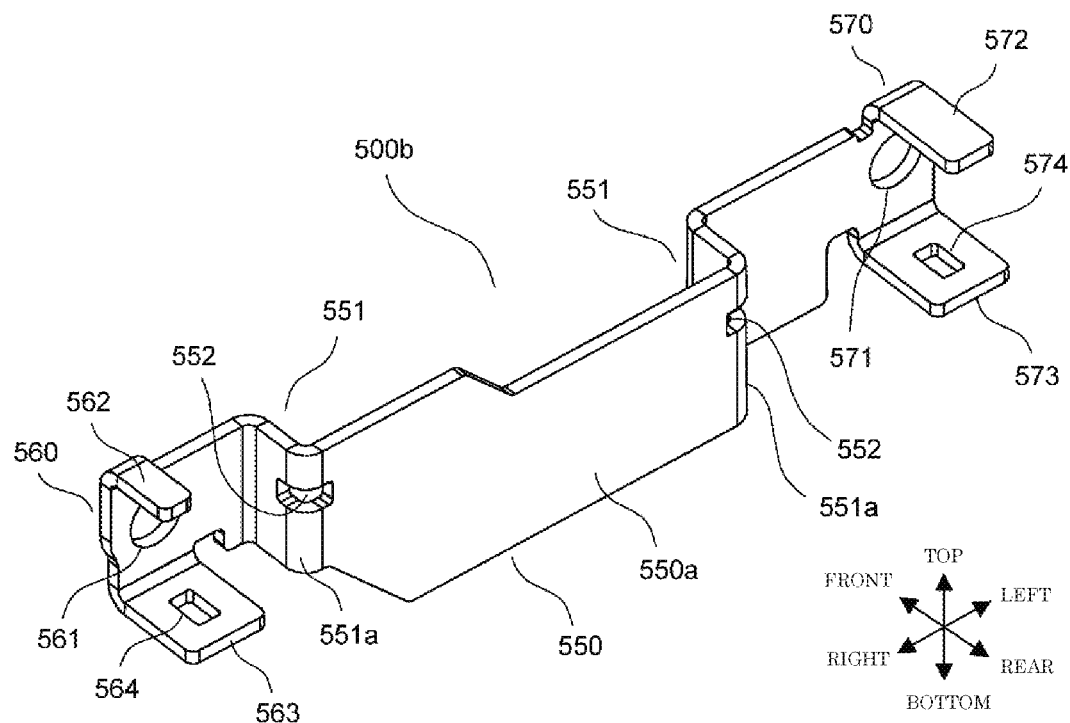
FIG. 4B is a rear perspective view illustrating the outer bus bar according to the exemplary embodiment.

FIG. 2A is a front perspective view illustrating capacitor element unit 100 according to this exemplary embodiment in a state where inner bus bar 500*a* and outer bus bar 500*b*, each included in first bus bar 500, are separated from each other. FIG. 2B is a rear perspective view illustrating capacitor element unit 100 according to this exemplary embodiment. FIG. 3 is an exploded perspective view illustrating inner bus bar 500*a*, second bus bar 600, and insulating plate 700, each according to this exemplary embodiment. FIG. 4A is a front perspective view illustrating outer bus bar 500*b* according to this exemplary embodiment, and FIG. 4B is a rear perspective view illustrating outer bus bar 500*b* according to this exemplary embodiment.

Capacitor element unit 100 includes two capacitor elements 400, first bus bar 500, second bus bar 600, and insulating plate 700.

Each of capacitor elements 400 is formed by stacking two metalized films in each of which aluminum is deposited on a dielectric film, winding or laminating the two metalized films stacked, and pressing the two metalized films stacked and wound or laminated into a flat shape. Each of the capacitor elements 400 has, on its one end face, first end-face electrode 410 formed by spraying metal such as zinc, and on its other end face, second end-face electrode 420 formed similarly by spraying metal such as zinc. Capacitor elements 400 are arranged in the left-to-right direction such that a circumference of each of two capacitor elements 400 opposes the other. In this state, first bus bar 500 and second bus bar 600 are connected to two capacitor elements 400. In this exemplary embodiment, first end-face electrode 410 corresponds to an N pole and second end-face electrode 420 corresponds to a P pole. First bus bar 500 serves as a bus bar on the N pole side, and second bus bar 600 serves as a bus bar on the P pole side.

Note that, each of capacitor elements 400 of this exemplary embodiment is formed of the metalized films, in each of which aluminum is deposited on the dielectric film, but may be formed of metalized films, in each of which other metal such as zinc or magnesium is deposited on the dielectric film. Alternatively, each of capacitor elements 400 may be formed of metalized films in each of which two or more of these metals are deposited on the dielectric film. Still alternatively, each of capacitor elements 400 may be formed of metalized films in each of which an alloy of these metals is deposited on the dielectric film.

First bus bar 500 includes inner bus bar 500*a* and outer bus bar 500*b*. Inner bus bar 500*a* is connected to first end-face electrode 410 and most part of inner bus bar 500*a* is housed in case 200. Outer bus bar 500*b* is connected to inner bus bar 500*a* outside case 200.

Inner bus bar 500*a* is made of a conductive material, for example, a copper plate (metal plate), and includes first main body 510, first electrode terminal 520, inner relay terminal 530, and first rear connection terminal 540. First bus bar 500 is formed by, for example, appropriately cutting out and bending a single copper plate. In first bus bar 500, first main body 510, first electrode terminal 520, inner relay terminal 530, and first rear connection terminal 540 are integrally formed.

First main body 510 has a substantially rectangular plate shape extending in the left-to-right direction. First main body 510 includes three openings 511, each formed in an oval shape. First electrode terminal 520 has a substantially rectangular plate shape and extends downward from a front end edge of first main body 510. At a lower end edge of first electrode terminal 520, two electrode pins 521 are formed at a position in correspondence to each of capacitor elements 400.

Inner relay terminal 530 is provided at a left end of the front end edge of first main body 510, extending upward from the front end edge to be bent forward. Then, inner relay terminal 530 extends forward to be narrowed and bent downward. Inner relay terminal 530 further extends downward until being bent leftward, slightly bent forward, and then bent and extend leftward. Inner relay terminal 530 has, at its tip end, connection portion 531 formed, and connection portion 531 includes connection hole 532 of a circular shape. Inner relay terminal 530 further includes two positioning holes 533, each formed at a position overlapping insulating plate 700 in the top-to-bottom direction.

Outer bus bar 500*b* is formed of a conductive material, for example, a copper plate (metal plate), and includes outer relay terminal 550, first front connection terminal 560, and connection portion 570. Outer bus bar 500*b* is formed by, for example, appropriately cutting out and bending a single copper plate, and outer relay terminal 550, first front connection terminal 560, and connection portion 570 are integrally formed. Outer bus bar 500*b* is greater in thickness than inner bus bar 500*a*, and for example, has a thickness that is approximately twice larger than a thickness of inner bus bar 500*a*.

Outer relay terminal 550 is a plate having a predetermined rectangular shape, elongating in the left-to-right direction as a whole. Outer relay terminal 550 includes two bent portions 551 respectively at two positions in the left-to-right direction. Each of two bent portions 551 is bent in a stepped shape. Portion 550*a*, which is located between two bent portions 551, projects rearward. At a rear side of each of bent portions 551, outer relay terminal 550 includes corner 551*a* and hole 552 to straddle corner 551*a*.

First front connection terminal 560 is connected to a right end of outer relay terminal 550. First front connection terminal 560 includes attachment hole 561 of a circular shape. First front connection terminal 560 further includes upper tongue piece 562 extending rearward from an upper end of first front connection terminal 560 and lower tongue piece 563 extending rearward from a lower end of first front connection terminal 560. Lower tongue piece 563 includes hole 564.

Connection portion 570 is connected to a left end of outer relay terminal 550. Connection portion 570 includes connection hole 571 of a circular shape. Connection portion 570 also includes upper tongue piece 572 extending rearward from an upper end of connection portion 570 and lower tongue piece 573 extending rearward from a lower end of connection portion 570. Lower tongue piece 573 includes hole 574.

Second bus bar 600 is formed of a conductive material, for example, a copper plate, and includes second main body 610, second electrode terminal 620, second front connection terminal 630, and second rear connection terminal 640. Second bus bar 600 is formed by, for example, appropriately cutting out and bending a single copper plate, and second main body 610, second electrode terminal 620, second front connection terminal 630, and second rear connection terminal 640 are integrally formed.

Second main body 610 is a plate having a substantially rectangular shape elongating in the left-to-right direction. Second main body 610 includes three openings 611, each formed in an oval shape. Second electrode terminal 620 is a plate having a substantially rectangular shape elongating in the left-to-right direction, and extends downward from a rear end edge of second main body 610. At a lower end edge of second electrode terminal 620, two electrode pins 621 are formed at a position in correspondence to each of capacitor elements 400.

Second front connection terminal 630 is provided to the left of the front end edge of second main body 610, extending upward from the front end edge to be bent forward. Then, second front connection terminal 630 extends forward to be bent downward and extend further downward. Second front connection terminal 630 has a width far greater in left-to-right direction than a width of inner relay terminal 530 in left-to-right direction. Second front connection terminal 630 includes connecting part 631 each at left side of its tip end and at right side of its tip end. Each of connecting parts 631 includes attachment hole 632 of a circular shape. Second front connection terminal 630 further includes two positioning holes 633, each formed at a position to overlap insulating plate 700 in the top-to-bottom direction.

Second rear connection terminal 640 is provided at a right end of the rear end edge of second main body 610, extending upward from the rear end edge to be bent rearward. Then, second rear connection terminal 640 extends rearward to be narrowed and bent downward. Second rear connection terminal 640 further extends downward until being bent rightward and bent rearward. Further, second rear connection terminal 640 is bent slightly downward while largely extending rearward, before being bent and extending rightward. Second rear connection terminal 640 includes, at its tip end, connecting part 641 that includes attachment hole 642 of a circular shape. Second rear connection terminal 640 also includes two positioning holes 643, each formed at a position to overlap insulating plate 700 in the top-to-bottom direction. Further, second rear connection terminal 640 includes square hole 644 at an area largely extending rearward.

Insulating plate 700 is made of resin such as polyphenylene sulfide (PPS), and has an insulating property. Insulating plate 700 includes first insulating portion 710, second insulating portion 720, and third insulating portion 730.

First insulating portion 710 is a plate having a substantially rectangular shape elongating in the left-to-right direction. First insulating portion 710 includes three openings 711, each formed in an oval shape. Two openings 711 at left and right sides of first insulating portion 710 among three openings 711 each has rib 712, which has an elliptic annular shape, at its circumferential edge. First insulating portion 710 further includes two protrusions 713 at its left end and two protrusions 713 at its right end. Two protrusions 713 are located along the front-to-rear direction at each of the left end and the right end of first insulating portion 710.

Second insulating portion 720 is provided to the left of a front end edge of first insulating portion 710. Second insulating portion 720 is formed in a saddle shape and in a size corresponding to inner relay terminal 530 and second front connection terminal 630. Second insulating portion 720 includes two positioning projections 721 and two positioning projections 722. Two positioning projections 721 are respectively located at positions in correspondence to two positioning holes 633 of second front connection terminal 630 at a front side. Two positioning projections 722 are respectively located at positions in correspondence to two positioning holes 533 of inner relay terminal 530 at a rear side.

Third insulating portion 730 is provided at a right end of a rear end edge of first insulating portion 710. Third insulating portion 730 is formed in an inverted L-shaped plate and in a size corresponding to first rear connection terminal 540 and second rear connection terminal 640. Third insulating portion 730 includes two positioning projections 731 and two positioning projections 732. Two positioning projections 731 are respectively located at positions in correspondence to two positioning holes 643 of second rear connection terminal 640 at a front side. Two positioning projections 732 are respectively located at positions in correspondence to two positioning holes 543 of first rear connection terminal 540 at a rear side.

When capacitor element unit 100 is assembled, initially, second bus bar 600 is laid on insulating plate 700 from above, and inner bus bar 500a of first bus bar 500 is laid beneath insulating plate 700 from below. In this state, insulating plate 700 has positioning projections 721 and 731 respectively fitted into positioning holes 633 and 643 of second bus bar 600. Insulating plate 700 also has ribs 712 of annular shape, one at its left side and the other at its right side, respectively fitted into two of three openings 611, one at left side and the other at right side of second bus bar 600. Further, insulating plate 700 has positioning projections 722 and 732 respectively fitted into positioning holes 533 and 543 of inner bus bar 500a. With this configuration, inner bus bar 500a and second bus bar 600 are respectively positioned and fixed with respect to insulating plate 700 in the front-to-rear direction and in the left-to-right direction. Concurrently, three openings 511 of inner bus bar 500a, three openings 611 of second bus bar 600, and three openings 711 of insulating plate 700 are aligned with one another.

Next, inner bus bar 500a of first bus bar 500 and second bus bar 600 are connected to each of capacitor elements 400. In other words, each of electrode pins 521 at the lower end edge of first electrode terminal 520 of inner bus bar 500a is joined to first end-face electrode 410 of each of capacitor elements 400 by a joining method such as soldering. As a result, first bus bar 500 is electrically connected to first end-face electrode 410. Similarly, each of electrode pins 621 at the lower end edge of second electrode terminal 620 of second bus bar 600 is joined to second end-face electrode 420 of each of capacitor elements 400 by the joining method such as soldering. As a result, second bus bar 600 is electrically connected to second end-face electrode 420. In this state, as illustrated in FIGS. 2A and 2B, capacitor element unit 100 has been completed, leaving outer bus bar 500b to be connected to inner bus bar 500a.

First main body 510 of inner bus bar 500a and second main body 610 of second bus bar 600 are arranged in layers with first insulating portion 710 of insulating plate 700 interposed therebetween. A part of inner relay terminal 530 of inner bus bar 500a and a part of second front connection terminal 630 of second bus bar 600 are arranged in layers with second insulating portion 720 of insulating plate 700 interposed therebetween. Further, a part of first rear connection terminal 540 of first bus bar 500 and a part of second rear connection terminal 640 of second bus bar 600 are arranged in layers with third insulating portion 730 of insulating plate 700 interposed therebetween. With this configuration, an equivalent series inductance (ESL) in each of first bus bar 500 (inner bus bar 500a) and second bus bar 600 is effectively reduced.

Figure 5A:
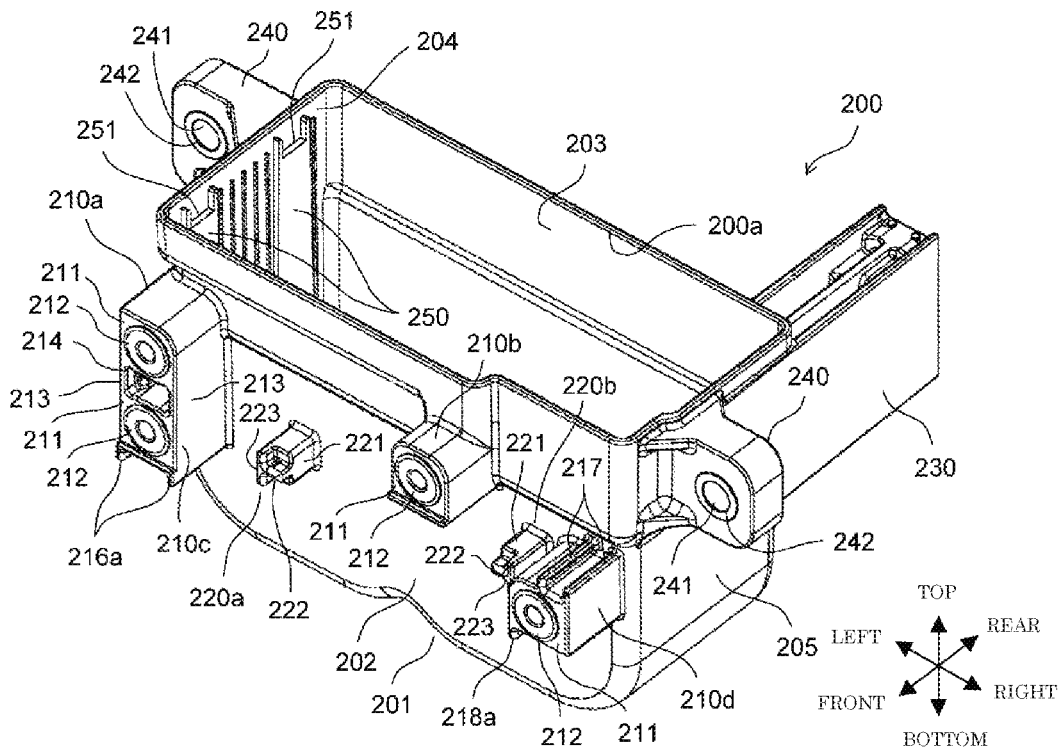
FIG. 5A is a front perspective view illustrating a case according to the exemplary embodiment.
Figure 5B:
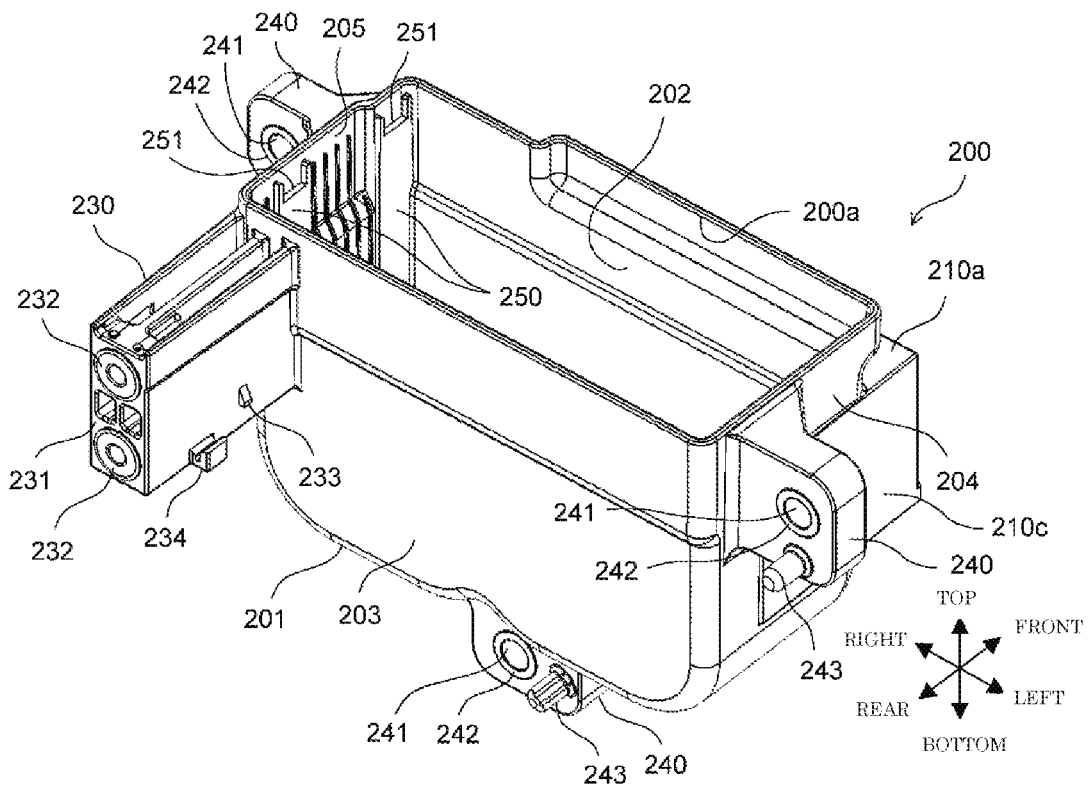
FIG. 5B is a rear perspective view illustrating the case according to the exemplary embodiment.
Figure 6:
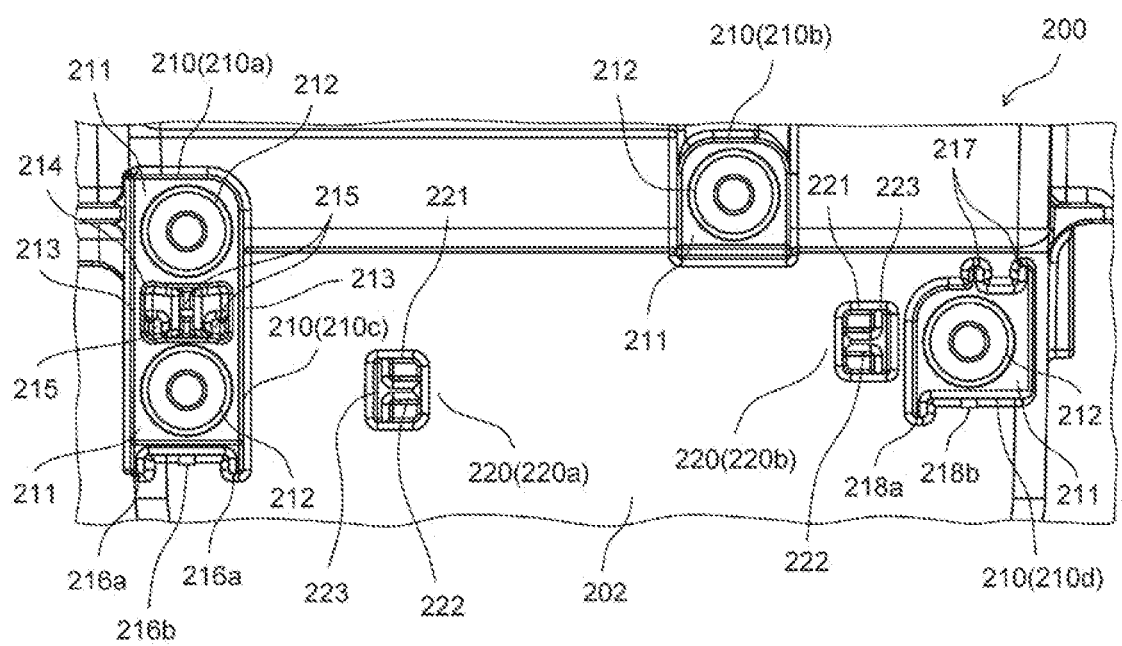
FIG. 6 is a partial enlarged front view illustrating the case according to the exemplary embodiment.

FIG. 5A is a front perspective view illustrating case 200 according to this exemplary embodiment, and FIG. 5B is a rear perspective view illustrating case 200 according to this exemplary embodiment. FIG. 6 is a partial enlarged front view illustrating case 200 according to this exemplary embodiment.

Case 200 is made of resin, for example, polyphenylene sulfide (PPS) as a thermoplastic resin. Case 200 has a substantially rectangular parallelepiped box shape. Case 200 includes bottom face 201 along with front side face 202, rear side face 203, left side face 204, and right side face 205, each rising from bottom face 201. And an upper face of case 200 has an opening. A dimension of each of front side face 202 and rear side face 203 in a left-to-right direction (i.e., a dimension in a direction parallel to a face of the opening in case 200) is greater than a dimension in a top-to-down direction (i.e., a dimension in a direction perpendicular to the face of the opening in case 200). Case 200 houses two capacitor elements 400 such that two capacitor elements 400 are arranged to align with each other in the left-to-right direction corresponding to a longitudinal direction of case 200. Capacitor elements 400 respectively have two end faces facing each other in the front-to-rear direction corresponding to a lateral direction of case 200.

Case 200 includes four front terminal blocks 210 (210a, 210b, 210c, and 210d) on an outer wall of front side face 202. Front terminal block 210a is located at an upper side of a left end of front side face 202, and front terminal block 210b is located slightly to the left of a center of front side face 202. Each of front terminal blocks 210a and 210b serves as a terminal block for second bus bar 600. Front terminal block 210c is located at a lower side of the left end of front side face 202, and front terminal block 210d is located at a right end of front side face 202. Each of front terminal blocks 210c and 210d serves as a terminal block for first bus bar 500. Each of front terminal blocks 210 has a substantially rectangular parallelepiped shape, and has each of nuts 212 made of metal embedded in installation surface 211 as a front face of a corresponding one of front terminal blocks 210.

Front terminal block 210a and front terminal block 210c arranged and aligned in the top-to-bottom direction are connected to each other via two ribs 213. Front terminal block 210a, front terminal block 210c, and two ribs 213 form a recess 214. In recess 214, three ribs 215 are formed in correspondence to upper tongue piece 572 of connection portion 570 of outer bus bar 500b. Front terminal block 210c has, on its lower side face, two ribs 216a and claw 216b formed in correspondence to lower tongue piece 573 of connection portion 570. Further, front terminal block 210d has, on its upper side face, two ribs 217 formed in correspondence to upper tongue piece 562 of first front connection terminal 560 of outer bus bar 500b. And front terminal block 210d has, on its lower side face, rib 218a and claw 218b formed in correspondence to lower tongue piece 563 of first front connection terminal 560.

Case 200 also includes two front fixing blocks 220 (220a and 220b) on the outer wall of front side face 202. Fixing block 220b is located at a right side on the outer wall and fixing block 220a is located at a left side on the outer wall. And fixing block 220b has a shape inverting fixing block 220a in the left-to-right direction. Each of fixing blocks 220 includes pedestal 221, projection 222, and ridge 223. Pedestal 221 has a substantially rectangular parallelepiped shape, and projection 222 and ridge 223 are integrally formed on pedestal 221. Ridge 223 extends in the top-to-bottom direction and has its intermediate portion connected to projection 222. Projection 222 and ridge 223 has a substantially T shape as a whole.

Case 200 has rear terminal block 230 formed at a right end of an outer wall of rear side face 203. Rear terminal block 230 has a substantially rectangular parallelepiped shape extending in both the top-to-bottom direction and the front-to-rear direction. Rear terminal block 230 has each of nuts 232 embedded in installation surface 231 as a front face of rear terminal block 230. Two nuts 232 are made of metal and arranged to align with each other in the top-to-bottom direction. Rear terminal block 230 has, on its left side face, claw 233 and hook 234.

Further, case 200 includes attachment tab 240 at an upper part of an outer wall of each of left side face 204 and right side face 205 as well as at a center part of an outer wall of bottom face 201. Each attachment tab 240 includes through hole 241. Collar 242 made of metal is fitted into through hole 241 to increase strength of the hole. Attachment tab 240 on each of right side face 205 and bottom face 201 includes positioning projection 243 projecting rearward. When film capacitor 1 is installed in an installation part of an electric automobile or the like, each attachment tab 240 is fixed to the installation part by bolts or the like.

In case 200, each of left side face 204 and right side face 205 includes, on its inner wall, supports 250, one at a front side and the other at a rear side of the inner wall. Each of supports 250 has, at its upper part, recess 251 recessed in a shape corresponding to a corresponding one of four protrusions 713 of insulating plate 700.

When capacitor element unit 100 is accommodated in case 200, each of four protrusions 713 of insulating plate 700 is fitted into a corresponding one of recesses 251 (a number of which is four) of case 200 (see FIG. 1B). In other words, each of four protrusions 713 and four recesses 251 functions as a positioning portion to position capacitor element unit 100, i.e., capacitor elements 400, in case 200, such that a gap is formed between capacitor elements 400 and projection 260 at each of left side face 204 and right side face 205 of case 200. Further, capacitor element unit 100 is supported by supports 250, a number of which is four, from bottom face 201 of case 200. Two capacitor elements 400 and bottom face 201 of case 200 have a gap therebetween.

When capacitor element unit 100 has been housed in case 200, filling resin 300 in a molten state is injected in case 200 through opening 200a. Filling resin 300 flows downward through three openings 511, three openings 611, and three openings 711 that are aligned with one another, so that filling resin 300 smoothly flows toward bottom face 201 of case 200. When case 200 has been filled with filling resin 300 to reach a vicinity of opening 200a and the injection of filling resin 300 has been completed, case 200 is heated and filling resin 300 is hardened in case 200.

When outer bus bar 500b has been attached to front side face 202 of case 200, outer bus bar 500b and inner bus bar 500a are connected to each other. In this state, film capacitor 1 is completed.

Figure 7A:
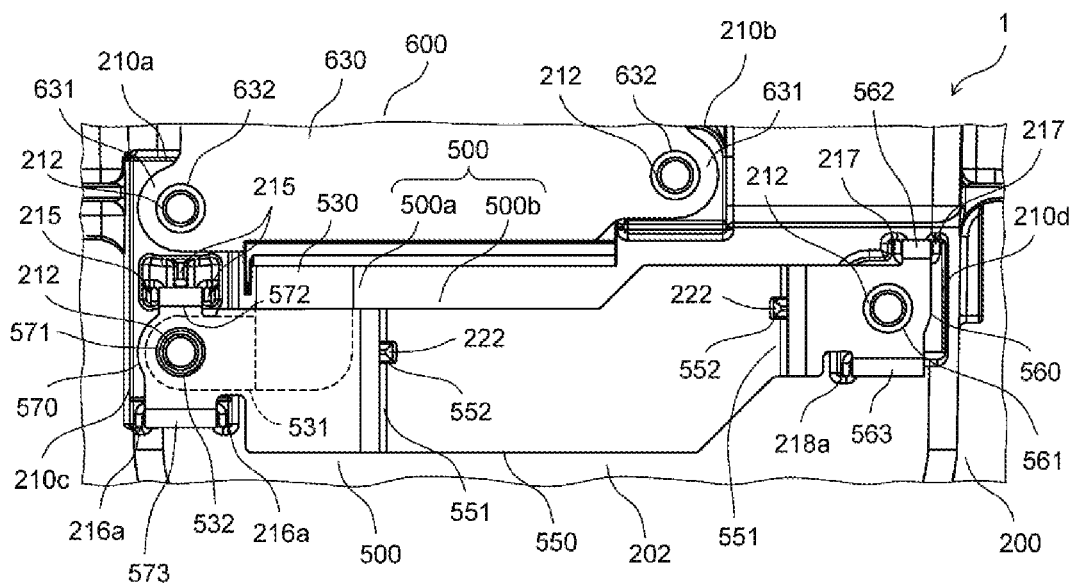
FIG. 7A is a partial enlarged front view illustrating the film capacitor according to the exemplary embodiment.
Figure 7B:
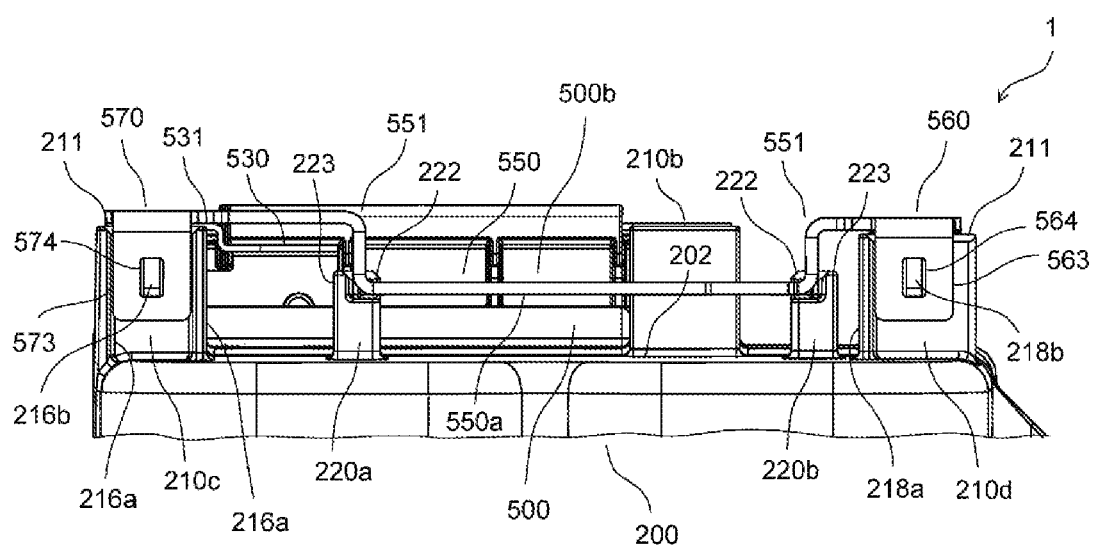
FIG. 7B is a partial enlarged bottom view illustrating the film capacitor according to the exemplary embodiment.

FIG. 7A is a partial enlarged front view illustrating film capacitor 1 according to this exemplary embodiment, and FIG. 7B is a partial enlarged bottom view illustrating film capacitor 1 according to this exemplary embodiment. Note that, each of FIGS. 7A and 7B illustrates film capacitor 1 before inner bus bar 500a and outer bus bar 500b are fixed to front terminal block 210c by bolt 800.

As illustrated in FIG. 1A, second front connection terminal 630 of second bus bar 600 is extended outside from opening 200a on the upper face of case 200 to extend forward. Connecting parts 631, one at the left side and the other at the right side of second front connection terminal 630, are respectively installed to installation surfaces 211 of front terminal blocks 210a and 210b of case 200. In this state, nuts 212 of front terminal blocks 210a and 210b respectively match attachment holes 632 of connecting parts 631.

Further, as illustrated in FIGS. 1A, 7A and 7B, inner relay terminal 530 of inner bus bar 500a is extended outside from opening 200a on the upper face of case 200 to extend forward. Connection portion 531 of inner relay terminal 530 is installed to installation surface 211 of front terminal block 210c, so that nut 212 of front terminal block 210c matches connection hole 532 of connection portion 531.

Outer bus bar 500b is attached to front terminal blocks 210c and 210d each of which is at the lower side, and is also attached to fixing blocks 220a and 220b. With regard to front terminal block 210c, outer bus bar 500b has connection portion 570 laid on connection portion 531 of inner relay terminal 530. In this state, connection hole 571 of connection portion 570 matches connection hole 532 of connection portion 531 of inner relay terminal 530 and nut 212 of front terminal block 210c. Front terminal block 210c is sandwiched by upper tongue piece 572 of connection portion 570 and lower tongue piece 573 of connection portion 570. Concurrently, upper tongue piece 572 is caught by three ribs 215 in recess 214. Further, lower tongue piece 573 is caught by two ribs 216a of front terminal block 210c, and claw 216b of front terminal block 210c is fitted into hole 574 of lower tongue piece 573. With this configuration, connection portion 570 of outer bus bar 500b is fixed to be restricted in movement in the top-to-bottom direction, the left-to-right direction, and the front-to-rear direction. Bolt 800 is inserted through connection hole 571 of connection portion 570 and connection hole 532 of connection portion 531 to be fastened to nut 212 of front terminal block 210c. With this configuration, inner bus bar 500a and outer bus bar 500b are connected and fixed to each other on front terminal block 210c.

With regard to front terminal block 210d, outer bus bar 500b has first front connection terminal 560 installed on installation surface 211 of front terminal block 210d, so that attachment hole 561 of first front connection terminal 560 matches nut 212 of front terminal block 210d. Concurrently, upper tongue piece 562 is caught by two ribs 217 of front terminal block 210d. Further, lower tongue piece 563 abuts rib 218a of front terminal block 210d, and claw 218b of front terminal block 210d fits into hole 564 of lower tongue piece 563. With this configuration, first front connection terminal 560 of outer bus bar 500b is fixed to be restricted in movement in the top-to-bottom direction, the left-to-right direction, and the front-to-rear direction.

Fixing blocks 220a and 220b respectively have projections 222 fitted into holes 552 of bent portions 551 included in outer relay terminal 550 of the outer bus bar 500b. With regard to fixing block 220a at the left side, ridge 223 approaches a corresponding one of bent portions 551 from the left side. With regard to fixing block 220b at the right side, ridge 223 approaches a corresponding one of bent portions 551 from the right side. With this configuration, fixing block 220a at the left side restricts outer relay terminal 550 in movement in the top-to-bottom direction and a leftward direction, and fixing block 220b at the right side restricts in movement in the top-to-bottom direction and a rightward direction. Accordingly, outer relay terminal 550 is fixed to be restricted in movement in the top-to-bottom direction and the left-to-right direction as a whole.

As has been described above, outer bus bar 500b is supported by two front terminal blocks 210c and 210d together with two fixing blocks 220a and 220b, so that a space (gap) is formed between outer relay terminal 550 and front side face 202 of case 200 (see FIG. 7B). In outer bus bar 500b, outer relay terminal 550 extends along front side face 202 of case 200 in the left-to-right direction corresponding to the longitudinal direction of front side face 202, until reaching first front connection terminal 560.

As illustrated in FIG. 1B, first rear connection terminal 540 of inner bus bar 500a and second rear connection terminal 640 of second bus bar 600 are extended outside from opening 200a on the upper face of case 200 to extend rearward. Connecting part 541 of first rear connection terminal 540 and connecting part 641 of second rear connection terminal 640 are installed on installation surface 231 of rear terminal block 230 included in case 200. In this state, attachment hole 542 of connecting part 541 and attachment hole 642 of connecting part 641 respectively match nuts 232 of rear terminal block 230. Concurrently, on the left side face of rear terminal block 230, claw 233 is fitted in square hole 644 of second rear connection terminal 640, and a lower end portion of second rear connection terminal 640 is fitted in hook 234. With this configuration, connecting part 641 of second rear connection terminal 640 is less likely to come off installation surface 231 of rear terminal block 230.

Film capacitor 1 may be mounted to, for example, an electric automobile. In this case, film capacitor 1 is connected to a power supply device to provide direct current power for driving an electric motor or others. The power supply device is provided with, for example, two external terminals (not illustrated) formed as a part of a bus bar, i.e., a positive electrode-side external terminal and a negative electrode-side external terminal. The negative electrode-side external terminal is bolted to nut 212 of front terminal block 210d to be connected to first front connection terminal 560, and the positive electrode-side external terminal is bolted to nuts 212 of front terminal blocks 210a and 210b to be connected to two connecting parts 631 of second front connection terminal 630.

Here, a large direct current of, for example, several hundreds of ampere could be flowed to film capacitor 1 from the power supply device. In this case, by flowing the large direct current, heat is significantly generated in the negative electrode-side external terminal, and the heat is transferred to first bus bar 500 (outer bus bar 500b) via first front connection terminal 560. First bus bar 500 includes outer relay terminal 550 extending along front side face 202 of case 200 in the left-to-right direction in the state where the space between outer relay terminal 550 and front side face 202 is ensured. Accordingly, the heat transferred to first bus bar 500 is dissipated from outer relay terminal 550.

Although first bus bar 500 could be also heated by the flow of the large direct current, this heat is also dissipated from outer relay terminal 550. With this configuration, the heat generated in the negative electrode-side external terminal and the heat generated in first bus bar 500 are less likely to be transferred to capacitor element 400, and thus, capacitor element 400 is less likely to be damaged by the heat.

Note that, although heat generated in the positive electrode-side external terminal and heat generated in second bus bar 600 are increased compared with when the current is small, the heat is less likely to be increased as much as the heat generated in the negative electrode-side external terminal and first bus bar 500. In this exemplary embodiment, by increasing the left-to-right width of second front connection terminal 630 of second bus bar 600, the heat dissipation from second bus bar 600 is enhanced. With this configuration, the heat generated in the positive electrode-side external terminal and in second bus bar 600 is less likely to be transferred to capacitor element 400.

<Effects of Exemplary Embodiment>

As has been described above, this exemplary embodiment exerts effects as follows.

First bus bar 500 is extended from opening 200a of case 200 to outside case 200. Outside case 200, first bus bar 500 includes outer relay terminal 550 extending along front side face 202 of case 200, and first front connection terminal 560 continued from outer relay terminal 550. Case 200 includes front terminal block 210c, front terminal block 210d, fixing block 220a, and fixing block 220b, each configured to support first bus bar 500, on front side face 202 such that the space is formed between front side face 202 and outer relay terminal 550. With this configuration, the heat generated in the external terminal and transferred to first bus bar 500 and/or the heat generated in first bus bar 500 can be effectively dissipated from outer relay terminal 550. Thus, the heat transferred to capacitor element 400 can be decreased. Accordingly, with film capacitor 1, it is possible to suppress an occurrence of heat damage to capacitor element 400.

First bus bar 500 includes inner bus bar 500a and outer bus bar 500b. Inner bus bar 500a is connected to first end-face electrode 410. Outer bus bar 500b is connected to inner bus bar 500a and includes outer relay terminal 550 and first front connection terminal 560. When first bus bar 500 is extended more out of case 200, first bus bar 500 may be required to have a more complex structure. With this configuration, however, first bus bar 500 is formed of two separate members, i.e., inner bus bar 500a and outer bus bar 500b, thereby simplifying manufacturing of first bus bar 500.

Here, a thickness of outer bus bar 500b is designed to be greater than a thickness of inner bus bar 500a. With this configuration, outer bus bar 500b, in other words, outer relay terminal 550 has a larger cross-sectional area, thereby improving thermal conductivity. Thus, the heat dissipation from outer relay terminal 550 can be improved.

Outer relay terminal 550 includes bent portions 551, each bent in the stepped shape. With this configuration, outer relay terminal 550 has an increased surface area, so that the heat dissipation from outer relay terminal 550 can be further improved.

Fixing block 220 includes pedestal 221 and projection 222 formed on pedestal 221, and outer relay terminal 550 includes hole 552 into which projection 222 is fitted. With this configuration, projection 222 and hole 552 fitted to each other restrict outer relay terminal 550 in movement with respect to fixing block 220. Thus, when capacitor element 400 vibrates during, for example, power-on, the vibration propagates but hardly causes outer relay terminal 550 to vibrate. In this state, the vibration is less likely to propagate to the external terminal.

Outer relay terminal 550 includes corners 551a of bent portions 551, and holes 552 to straddle corners 551. Each of fixing blocks 220 includes pedestal 221, projection 222, and ridge 223. And on pedestal 221, ridge 223 is connected to projection 222 and extends in the direction (top-to-bottom direction) perpendicular to the direction (left-to-right direction) in which outer relay terminal 550 extends, so as to approach a corresponding one of bent portions 551. With this configuration, each of ridges 223 is in contact with a corresponding one of bent portions 551, inhibiting the movement of outer relay terminal 550 in the direction toward ridge 223. In this state, outer relay terminal 550 is less likely to move with respect to each of fixing blocks 220. Concurrently, ridge 223 reinforces projection 222, so that projection 222 is less likely to be damaged by force applied to projection 222 when projection 222 is fitted into hole 552 of outer relay terminal 550.

Outer relay terminal 550 extends along front side face 202 of case 200. Front side face 202 has the left-to-right dimension (i.e., the dimension in the direction parallel to the face of the opening in case 200) greater than the top-to-down dimension (i.e., the dimension in the direction perpendicular to the face of the opening in case 200). Here, outer relay terminal 550 extends in the left-to-right direction, in which front side face 202 has the greater dimension. With this configuration, outer relay terminal 550 can be designed longer, thereby facilitating the heat dissipation from outer relay terminal 550.

The exemplary embodiment of the present disclosure has been described above. Meanwhile, the present disclosure is not limited to the foregoing exemplary embodiment, and application examples of the present disclosure may include various modifications in addition to the foregoing exemplary embodiment.

For example, in the foregoing exemplary embodiment, first bus bar 500 is formed of two members, i.e., inner bus bar 500a and outer bus bar 500b, connected to each other. Meanwhile, first bus bar 500 may be formed of one member.

In the foregoing exemplary embodiment, first bus bar 500, in other words, outer bus bar 500b is supported by two front terminal blocks 210c and 210d and two fixing blocks 220a and 220b. Meanwhile, any one of these four supporting parts may be omitted, or a new supporting part may be additionally provided.

In the foregoing exemplary embodiment, in order to further enhance the heat dissipation from second bus bar 600, the configuration of second front connection terminal 630 of second bus bar 600 may be modified to be similar to the configuration of outer bus bar 500b and inner relay terminal 530 of inner bus bar 500a. In particular, when a large alternating current is applied to film capacitor 1, as has been described above, the heat dissipation from second bus bar 600 is preferably required to be enhanced.

In the foregoing exemplary embodiment, outer relay terminal 550 includes two bent portions 551, between which portion 550a is formed to approach front side face 202. With this configuration, when film capacitor 1 has been installed, outer relay terminal 550 is less likely to interfere with other parts surrounding film capacitor 1, ensuring a space to install other parts. Meanwhile, when the interference between outer relay terminal 550 and other parts surrounding film capacitor 1 is not a concern, outer relay terminal 550 may include two bent portions 551, between which portion 550a is formed away from front side face 202.

In the foregoing exemplary embodiment, fixing block 220 has the configuration where projection 222 and ridge 223 are formed on pedestal 221 in the substantially T shape. Meanwhile, fixing block 220 may have a configuration where ridge 223 is not formed on pedestal 221. In this case, outer relay terminal 550 may include hole 552 at a position other than bent portions 551 such that projection 222 of fixing block 220 is fitted into hole 552.

In the foregoing exemplary embodiment, outer relay terminal 550 includes two bent portions 551. Meanwhile, a number of bent portions 551 may be one or may be equal to or more than three.

In the foregoing exemplary embodiment, outer bus bar 500b (outer relay terminal 550) is disposed on front side face 202 of case 200. Meanwhile, outer bus bar 500b may be disposed on any one of side faces of case 200.

In the foregoing exemplary embodiment, two capacitor elements 400 are included in capacitor element unit 100. Meanwhile, a number of capacitor elements 400 included in capacitor element unit 100 may be appropriately modified, such as only one.

In the foregoing exemplary embodiment, each of capacitor elements 400 is formed by stacking the two metalized films in each of which aluminum is deposited on the dielectric film, and winding or laminating the two metalized films stacked. Alternatively, each of capacitor elements 400 may be formed by stacking an insulating film and a metalized film that includes a dielectric film and aluminum deposited on both sides of the dielectric film, and winding or laminating the insulating film and the metalized film stacked each other.

In the foregoing exemplary embodiment, film capacitor 1 is used as an example of a capacitor of the present disclosure. Meanwhile, the present disclosure may be applied to other capacitors in addition to film capacitor 1.

Additionally, various modifications may be appropriately made to the exemplary embodiment of the present disclosure within the scope of the technical concept disclosed in the appended claims of the present disclosure.

It should be noted that, in the description of the foregoing exemplary embodiment, a term indicating each direction, such as "upward" or "downward", indicates a relative direction that only depends on a relative positional relationship of constituent members, and thus does not indicate an absolute direction, such as a vertical direction or a horizontal direction.

The present disclosure is usable for capacitors to be used in various types of electronic devices, electrical devices, industrial equipment, electric components for vehicles, and the like.

What is claimed is:

1. A capacitor comprising:
a capacitor element;
an electrode disposed on an end face of the capacitor element;
a bus bar connected to the electrode; and
a case housing the capacitor element,
wherein:
the bus bar is extended from an opening of the case to an outside of the case,
the bus bar outside the case includes an extension part and a connection terminal, the extension part extending in a first direction along a side face of the case, the connection terminal being connected to the extension part,
the case includes a supporting part disposed on the side face of the case, the supporting part supporting the bus bar to form a space between the side face and the extension part, and
the bus bar includes a first member and a second member, the first member being connected to the electrode, the second member being connected to the first member and including the extension part and the connection terminal, and
a thickness of the second member is greater than a thickness of the first member.

2. The capacitor according to claim 1, wherein the extension part includes a bent portion that is bent in a stepped shape.

3. The capacitor according to claim 2, wherein:
the supporting part includes a pedestal and a projection disposed on the pedestal, and
the extension part has a hole into which the projection is fitted.

4. The capacitor according to claim 3, wherein:
the hole straddles a corner of the bent portion, and
a ridge is disposed on the pedestal to approach the bent portion, the ridge being connected to the projection and extending in a second direction perpendicular to the first direction.

5. The capacitor according to claim 1, wherein:
the supporting part includes a pedestal and a projection disposed on the pedestal, and
the extension part has a hole into which the projection is fitted.

6. The capacitor according to claim 1, wherein:
the first direction is parallel to a face of the opening of the case, and
a dimension of the side face of the case in the first direction is greater than a dimension of the side face of the case in a second direction perpendicular to the first direction.

7. A capacitor comprising:
a capacitor element;
an electrode disposed on an end face of the capacitor element;
a bus bar connected to the electrode; and
a case housing the capacitor element,
wherein:
the bus bar is extended from an opening of the case to an outside of the case,
the bus bar outside the case includes an extension part and a connection terminal, the extension part extending in a first direction along a side face of the case, the connection terminal being connected to the extension part,
the case includes a supporting part disposed on the side face of the case, the supporting part supporting the bus bar to form a space between the side face and the extension part,
the extension part includes a bent portion that is bent in a stepped shape,
the supporting part includes a pedestal and a projection disposed on the pedestal,
the extension part has a hole into which the projection is fitted,
the hole straddles a corner of the bent portion, and
a ridge is disposed on the pedestal to approach the bent portion, the ridge being connected to the projection and extending in a second direction perpendicular to the first direction.

8. The capacitor according to claim 7, wherein the bus bar includes a first member and a second member, the first member being connected to the electrode, the second member being connected to the first member and including the extension part and the connection terminal.

9. The capacitor according to claim 8, wherein a thickness of the second member is greater than a thickness of the first member.

10. The capacitor according to claim 7, wherein:
the supporting part includes a pedestal and a projection disposed on the pedestal, and
the extension part has a hole into which the projection is fitted.

11. The capacitor according to claim 7, wherein:
the first direction is parallel to a face of the opening of the case, and
a dimension of the side face of the case in the first direction is greater than a dimension of the side face of the case in a second direction perpendicular to the first direction.

* * * * *